(12) United States Patent  
Collins (10) Patent No.: US 8,123,161 B1
(45) Date of Patent: Feb. 28, 2012

(54) AIRCRAFT LANDING GEAR UNLOCK ACTUATOR

(75) Inventor: Andrew John Collins, WestonSuperMare (GB)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 939 days.

(21) Appl. No.: 12/131,996

(22) Filed: Jun. 3, 2008

(51) Int. Cl.
*B64C 13/00* (2006.01)

(52) U.S. Cl. .................. 244/99.9; 244/102 R; 74/89.35

(58) Field of Classification Search ............... 244/99.9, 244/102 R, 99.2; 74/83.35, 82.23
See application file for complete search history.

(56) References Cited

U.S. PATENT DOCUMENTS

| | | | |
|---|---|---|---|
| 2,660,029 A * | 11/1953 | Geyer | 60/709 |
| 2,667,953 A * | 2/1954 | Griswold | 192/13 R |
| 4,422,603 A * | 12/1983 | Turiot et al. | 244/102 R |
| 4,603,594 A * | 8/1986 | Grimm | 74/89.39 |
| 4,762,205 A * | 8/1988 | Ortman | 188/71.2 |
| 4,876,906 A * | 10/1989 | Jones | 74/89.25 |
| 5,092,539 A | 3/1992 | Caero | |
| 5,120,285 A | 6/1992 | Grimm | |
| 5,288,037 A | 2/1994 | Derrien | |
| 5,333,816 A | 8/1994 | Del Monte | |
| 5,360,185 A | 11/1994 | Derrien | |
| 6,237,433 B1 * | 5/2001 | Rodrigues | 74/89.39 |
| 6,776,376 B2 | 8/2004 | Collins | |
| 6,802,476 B2 | 10/2004 | Collet et al. | |
| 7,098,619 B2 | 8/2006 | Stridsberg | |
| 7,190,096 B2 | 3/2007 | Blanding et al. | |
| 7,883,054 B2 * | 2/2011 | Elliott et al. | 244/99.9 |

* cited by examiner

*Primary Examiner* — Christopher P Ellis
(74) *Attorney, Agent, or Firm* — Carlson, Gaskey & Olds, P.C.

(57) ABSTRACT

This disclosure relates to a landing gear system that includes a landing gear strut rotatable between stowed and deployed positions. A lock-stay is connected to the landing gear strut and is movable between locked and unlocked conditions. An unlock actuator is connected to the lock-stay and includes first and second members movable relative to one another. The first member is movable between first and second positions that correspond to the locked and unlocked conditions. A controller is in communication with the unlock actuator and is configured to command the unlock actuator between the first and second positions in response to an input. The second member is permitted to free-drive relative to the first member between the stowed and deployed positions with the lock-stay in the unlocked condition.

13 Claims, 8 Drawing Sheets

AIRCRAFT LANDING GEAR UNLOCK ACTUATOR

BACKGROUND

This disclosure relates to an aircraft landing gear unlock actuator. More particularly, this disclosure relates to an unlock actuator that when mechanically jammed will not prevent the landing gear from fully deploying.

Aircraft employ landing gear arrangements that must be reliably deployed from a stowed position during landing. In one type of arrangement, the landing gear is rotated about a pivot by an extend/retract actuator. A lock-stay is biased over-center to lock the landing gear in a deployed position.

To retract the landing gear, an unlock actuator pulls the lock-stay from over-center, which enables the extend/retract actuator to retract the landing gear to the stowed position. During the locking and unlocking sequence, it is possible for the unlock actuator to experience a mechanical jam. It is important that any mechanical jam does not prevent the landing gear from fully deploying during the next landing gear deploy cycle. What is needed is a jam tolerant unlock actuator that enables the landing gear to be fully deployed regardless of a mechanical jam.

SUMMARY

This disclosure relates to a landing gear system that includes a landing gear strut rotatable between stowed and deployed positions. A lock-stay is connected to the landing gear strut and is movable between locked and unlocked conditions. An unlock actuator is connected to the lock-stay and includes first and second members movable relative to one another, in one example. The first member is movable between first and second positions that correspond to the locked and unlocked conditions. A controller is in communication with the unlock actuator and is configured to command the unlock actuator between the first and second positions in response to an input. The second member is permitted to free-drive relative to the first member between the stowed and deployed positions with the lock-stay in the unlocked condition.

These and other features of the application can be best understood from the following specification and drawings, the following of which is a brief description.

BRIEF DESCRIPTION OF THE DRAWINGS

Other advantages of the example embodiment can be understood by reference to the following detailed description when considered in connection with the accompanying drawings wherein:

FIGS. 5A-10B schematically illustrate the unlock actuator throughout the retract and deploy cycles with a mechanical jam.

DETAILED DESCRIPTION

Figure 1A:
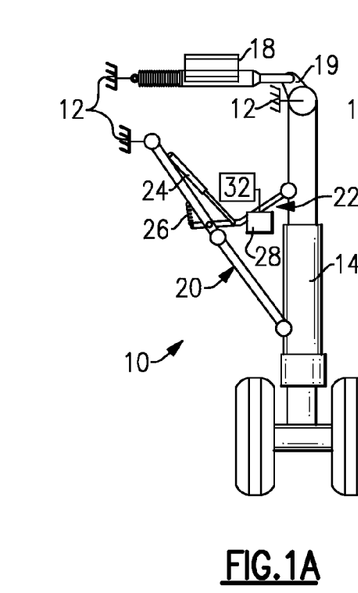
FIGS. 1A-1D schematically illustrate the landing gear in deployed and locked, deployed and unlocked, retracting and stowed positions, respectively.
Figure 1B:
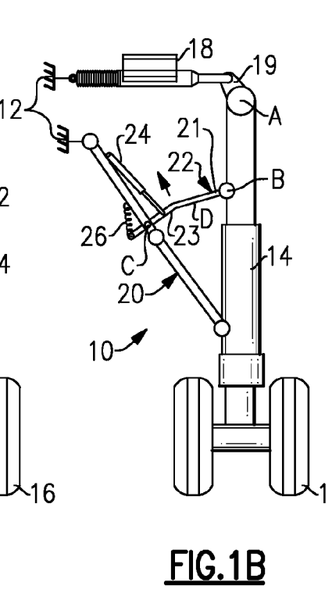
Figure 1C:
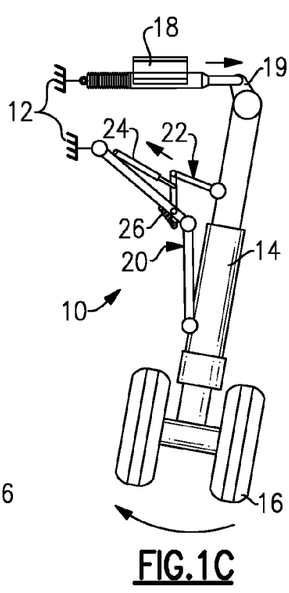
Figure 1D:
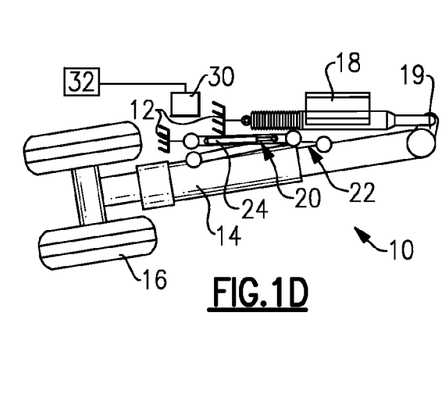

A retracting cycle of a landing gear 10 is illustrated in FIGS. 1A-1D. FIG. 1A depicts the landing gear 10 in a fully deployed position and locked. FIG. 1B depicts the landing gear 10 in a fully deployed position and unlocked. FIG. 1C depicts the landing gear 10 while it is being retracted. FIG. 1D depicts the landing gear 10 in a stowed position.

The landing gear 10 includes a strut 14 supporting wheels 16. The strut 14 is rotatable about a pivot, which is provided by an airframe 12, in response to an extend/retract actuator applying a force to an arm 19. A linkage 20 connects a lower portion of the strut 14 to the airframe 12, for example. A lock-stay 22 is interconnected between the linkage 20 and the strut 14 to lock the landing gear 10 in the fully deployed position until the pilot retracts the landing gear.

In FIG. 1A, the landing gear 10 is shown locked in the fully deployed position. The example lock-stay 22 includes first and second links 21, 23 pivotally secured to one another at a joint D, best shown in FIG. 1B. One end of the first link 21 is connected to the strut 14 at pivot B. A portion of the second link 23 is connected to the linkage 20 at pivot C. A biasing member 26 is arranged between the lock-stay 22 and the linkage 20 to bias the lock-stay 22 to the locked position shown in FIG. 1A. An unlock actuator 24 is interconnected between the linkage 20 and lock-stay 22 to pull the joint D from over-center, as depicted by the arrow in FIG. 1B (from the locked position shown in FIG. 1A), so that the extend/retract actuator 18 can move the landing gear 10 to a stowed position.

For the example unlock actuator 24, once the lock-stay 22 has been moved from over-center, the unlock actuator 24 free-drives. That is, the lock-stay 22 is no longer moved under the power of the unlock actuator 24, but rather, the extend/retract actuator 18 moves the lock-stay 22 and unlock actuator 24 as the landing gear 10 is stowed.

A controller 32 is used to control the operation of the landing gear and sense the location of various components. The controller 32 can be hardware and/or software and constructed as single or multiple units. For example, a lock position sensor 28 communicates with the controller 32 to detect the lock-stay 22 in a locked position, as shown schematically in FIG. 1A. The stowed position sensor 30 communicates with the controller 32 and detects the position of a portion of the landing gear 10 to ensure that the landing gear is fully stowed.

Figure 2:
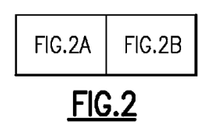
FIG. 2 is a schematic view of a control system for the extend/retract and unlock actuators.
Figure 2A:
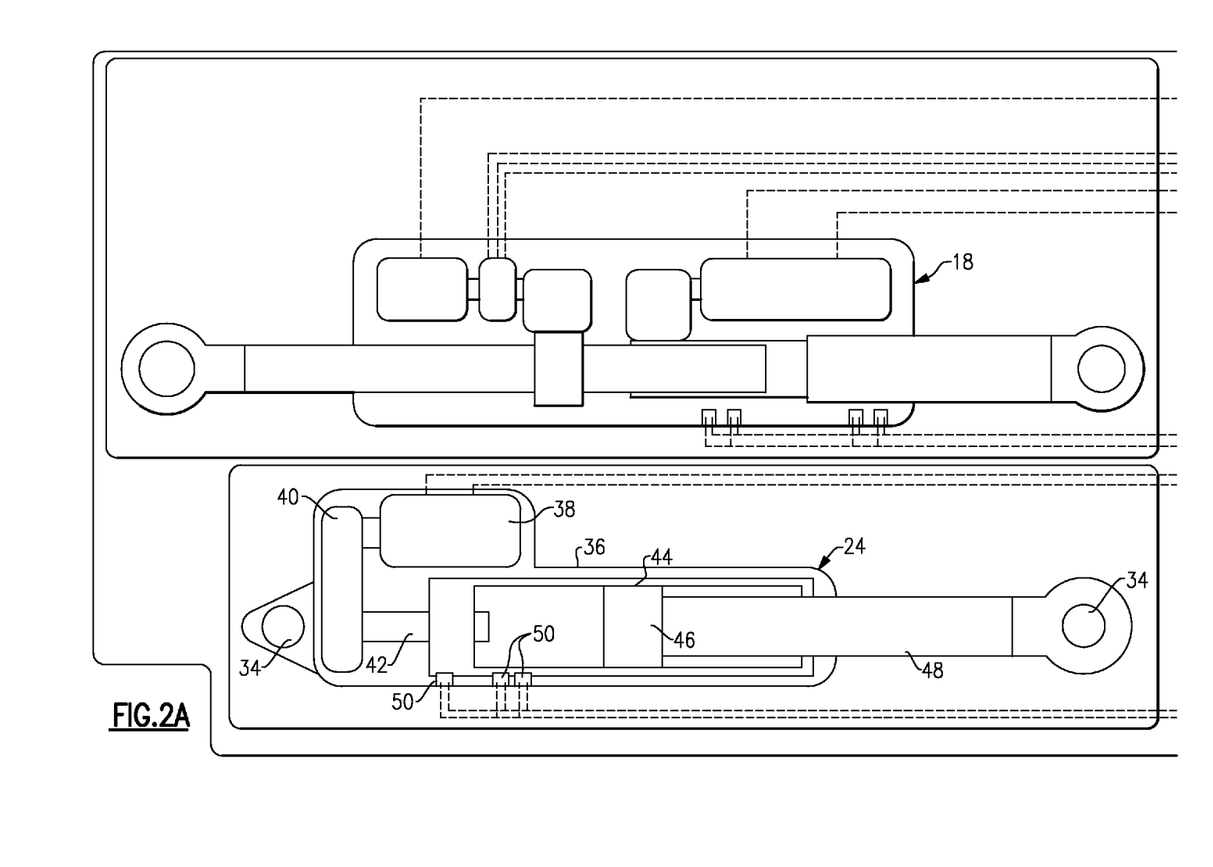
Figure 2B:
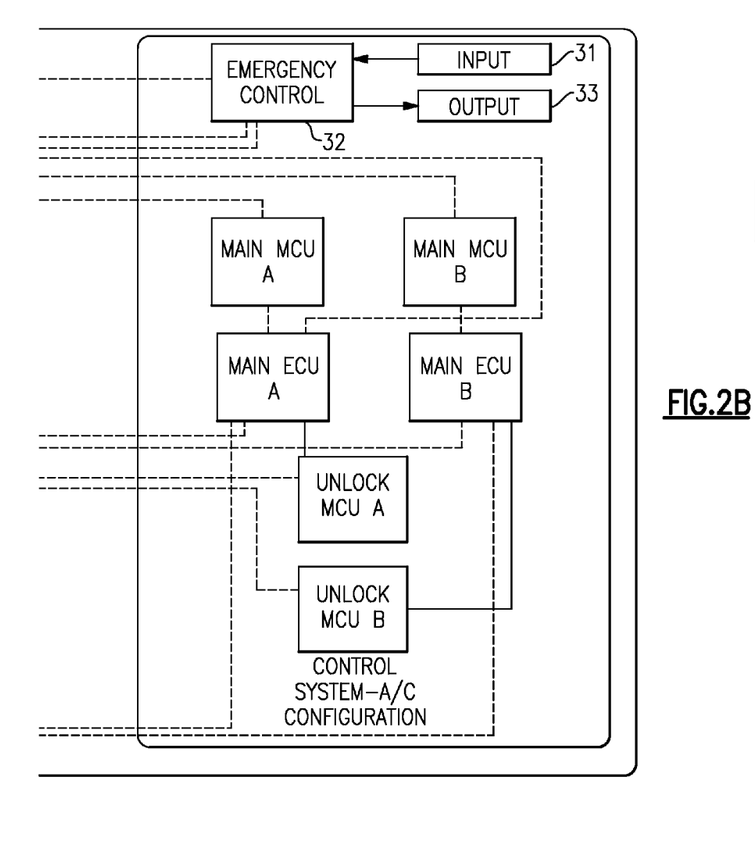

Other sensors can be used to detect faults in the operation of the landing gear. For example, position sensors 50 are associated with the unlock actuator 24 to determine positions of components within the unlock actuator 24, as shown in FIG. 2. The position sensors 50 are in communication with the controller 32 and are used to evaluate whether a fault has occurred. Input and output devices 31, 33 are also in communication with the controller 32. The input device 31 includes one or more pilot initiated controls, for example. The output device 33 includes a fault indicator or a position indicator, for example.

Figure 3:
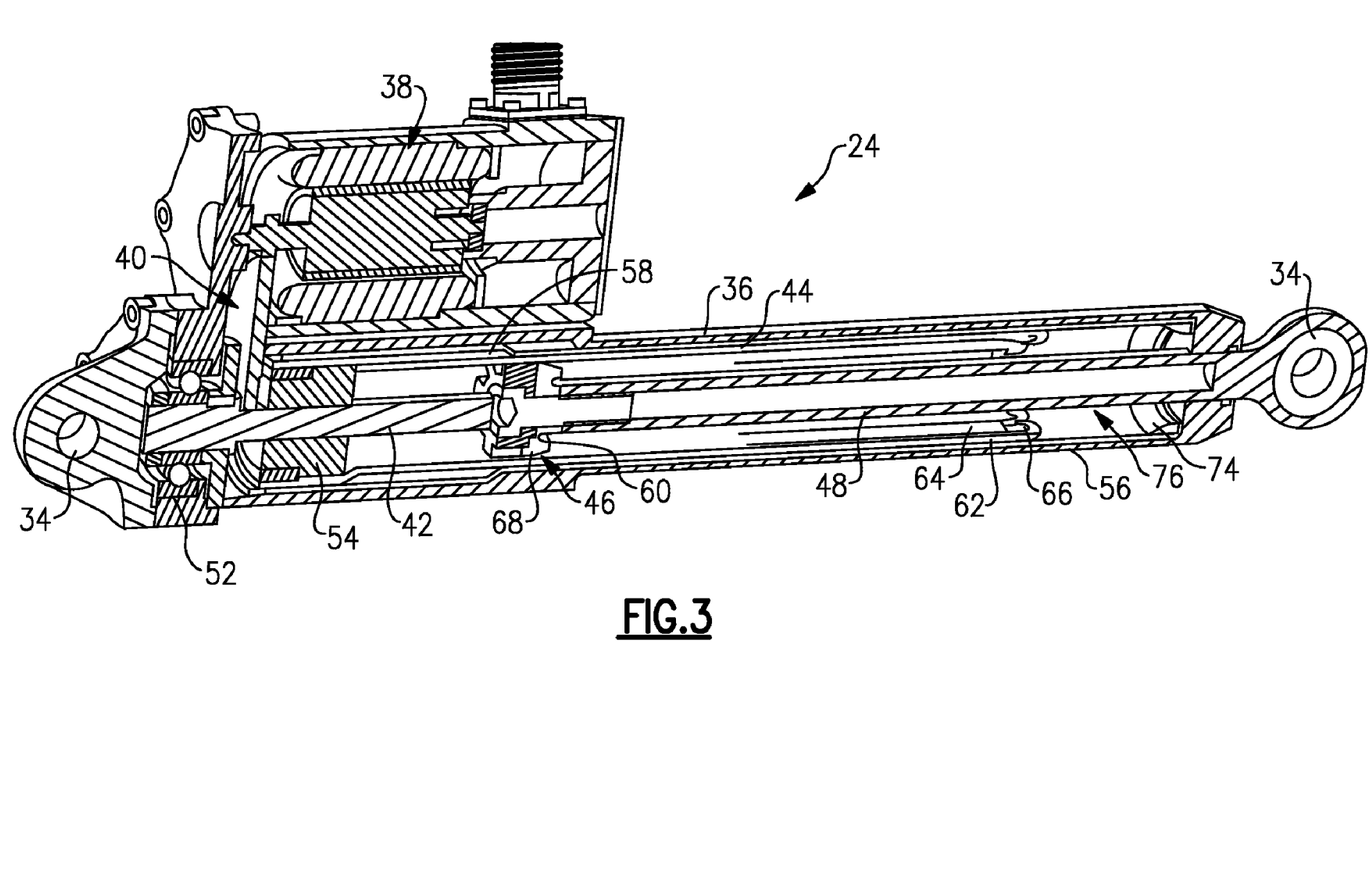
FIG. 3 is a perspective cross-sectional view of the unlock actuator.

Referring to FIGS. 2 and 3, the unlock actuator 24 includes a body that houses a motor 38. The motor 38 drives a screw 42 through gears 40, for example. A finger tube 44 is driven axially by the screw 42. A guide 46 is housed within the finger tube 44 and supports a rod 48. The finger tube 44 and rod 48 are coaxial with one another in the example. During normal operation, the finger tube 44 and rod 48 remain nested with one another. Ends 34 are provided by the body 36 and rod 48. The ends 34 are interconnected between the linkage 20 and lock-stay 22. As shown in FIG. 2, the position sensors 50 detect the axially position of the finger tube 44. The actual position of the finger tube 44 relative to a commanded position can indicate a mechanical jam and trigger a fault.

Referring to FIG. 3, one end of the screw 42 is supported by a bearing 52. An end of the finger tube 44 includes a nut 54 that is threadingly received by the screw 42. A sleeve 56 is positioned within the body 36 and provides a stop 58 that limits the axial travel of the finger tube 44. In the example, the axial distance that the finger tube 44 can travel from "stop to stop" corresponds to the distance needed to pull the lock-stay 22 from over-center to the unlocked condition.

Figure 5A:
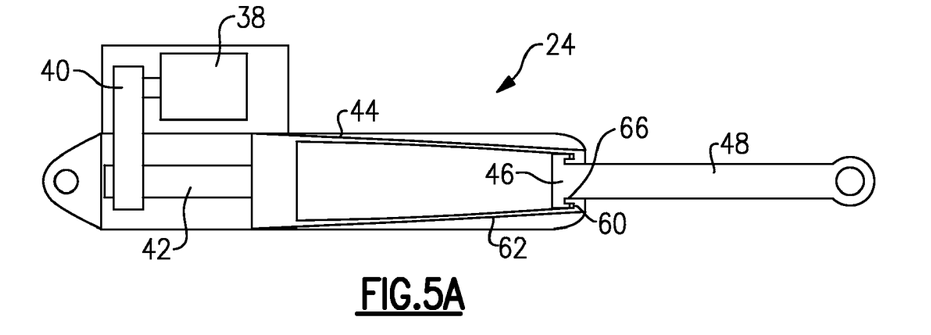
Figures 5B, 10B:
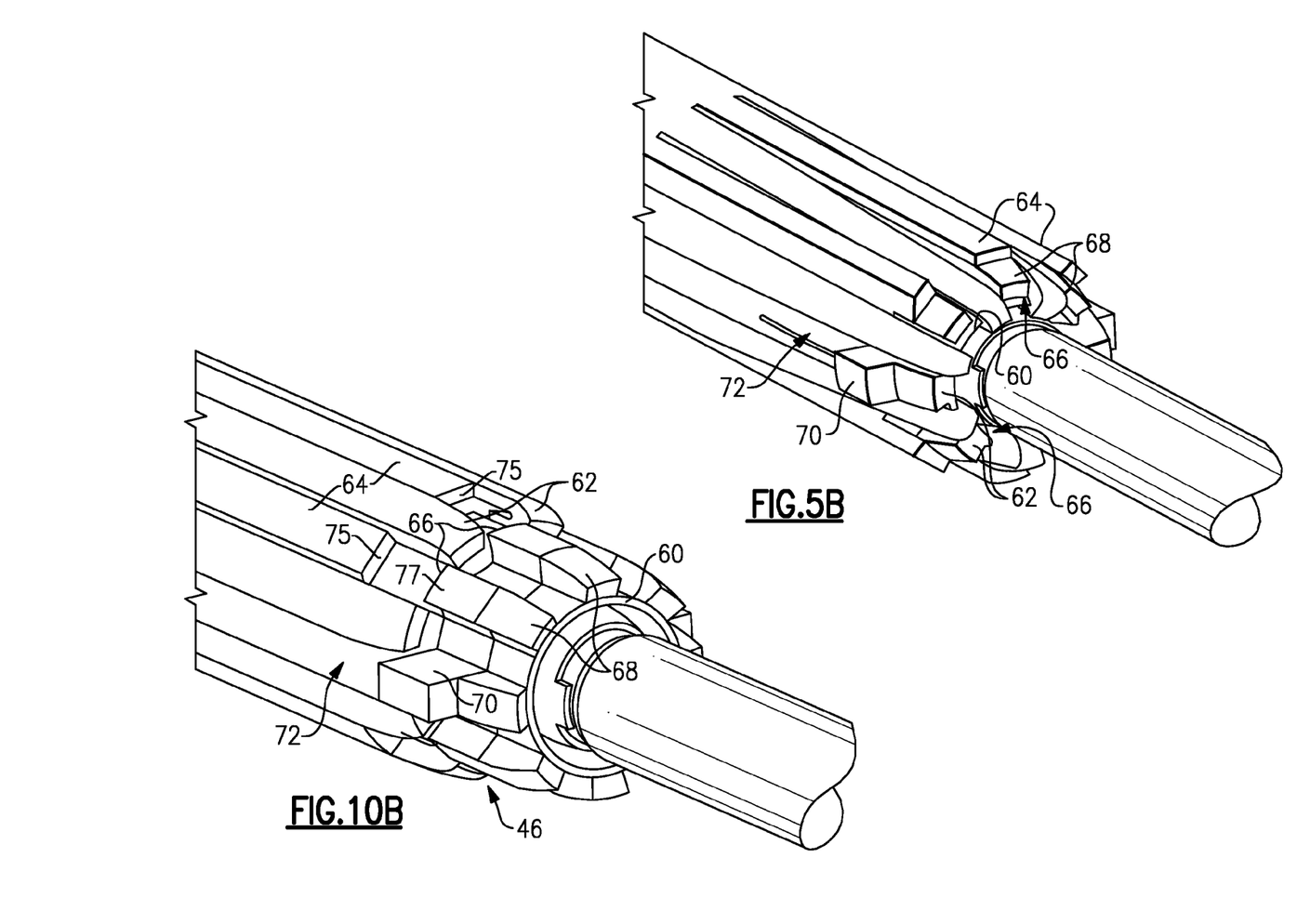

An end of the finger tube 44 includes first and second sets of fingers 62, 64. In the example, the first set of fingers 62 includes hooks 66 that cooperate with a lip 60 provided by one side of the guide 46 (shown in FIG. 5B). The first set of fingers 62 are moved radially inward when the first set of fingers 62 engage an annular tapered collar 74. The first set of fingers 62 extend axially beyond the second set of fingers 64. Referring to FIG. 5B, the guide 46 includes a key 70 that is received by a slot 72 that extends axially along a portion of the finger tube 44. The key and slot 70, 72 cooperate with one another to prevent rotation of the guide 46 and rod 48.

Figure 4:
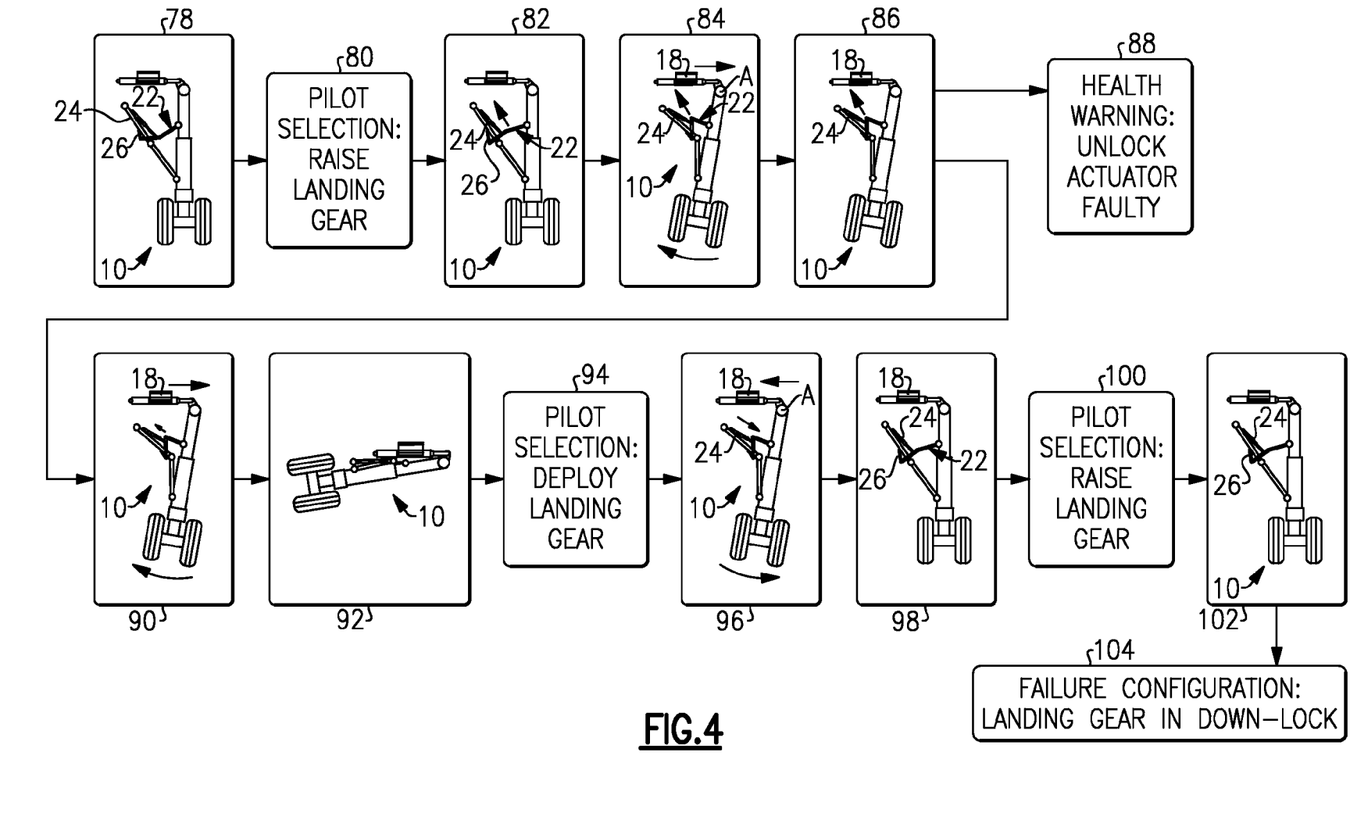
FIG. 4 is a flow chart depicting a retract and deploy cycle in the event of a mechanical jam.

The operation of the landing gear 10 is schematically illustrated by the flow chart shown in FIG. 4. As shown in block 78, the landing gear 10 is illustrated in a fully deployed position and locked. The lock-stay 22 is biased in the locked position (with the joint D over-center) by the biasing member 26. Referring to FIGS. 5A and 5B, the unlock actuator 24 is illustrated in the locked position with a "normally" operating unlock actuator. The finger tube 44 has been axially advanced by the screw 42 with the motor 38 and gears 40 to the position shown. The first set of fingers 62 has been moved radially inwardly by the tapered collar 74 (not shown). With the finger tube 44 in the illustrated axial position, the biasing member 26 is able to move the rod 48 a sufficient axial amount to enable the biasing member 26 to move the lock-stay 22 to the locked position. In the position shown in FIGS. 5A and 5B, the hooks 66 engage the lip 60 in preparation for pulling the rod 48 to move the lock-stay 22 to an unlocked condition.

The pilot, for example, provides an input through input device 31 to raise the landing gear, as indicated in block 80. In response to the pilot's command to raise the landing gear 10, the unlock actuator 24 axially moves the finger tube 44 with the screw 42 to retract the rod 48 and move the lock-stay 22 as shown at blocks 82 and 84. The hooks 66 and lip 60 are interlocked with one another such that the finger tube 44 pulls the rod 48 and remains in engagement with the guide 46 even after the first set of fingers 62 have moved out of engagement with the tapered collar 74.

Figure 6:
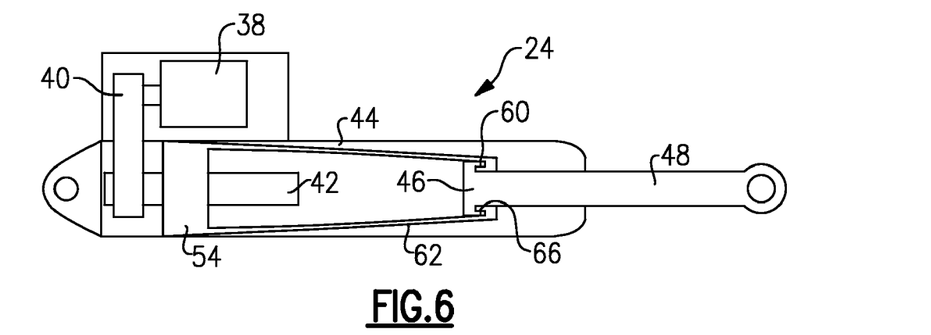

A mechanical jam is illustrated in FIGS. 6-10B. The mechanical jam depicted (block 86) is one in which the screw 42 is unable to retract the finger tube 44 to its axially retracted position, such as if the screw 42 and nut 54 have become frozen to one another, as shown in FIG. 6. As illustrated at block 88, a fault is triggered for example, by position sensors 50 (FIG. 2) indicating that the unlock actuator 24 is malfunctioning and in need of replacement.

Figure 7:
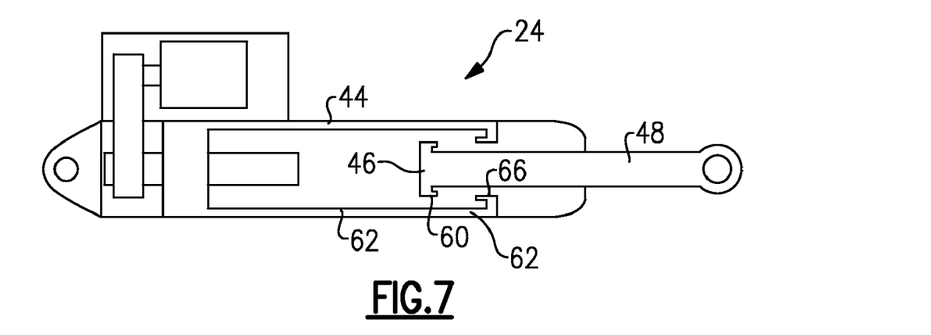
Figure 8:
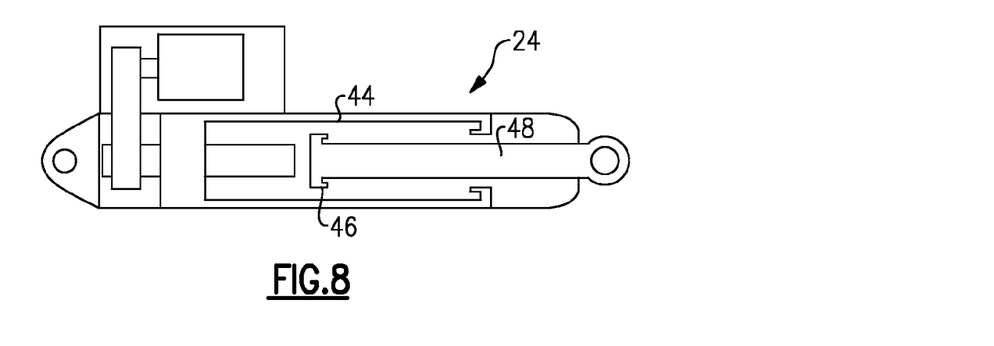
Figure 9:
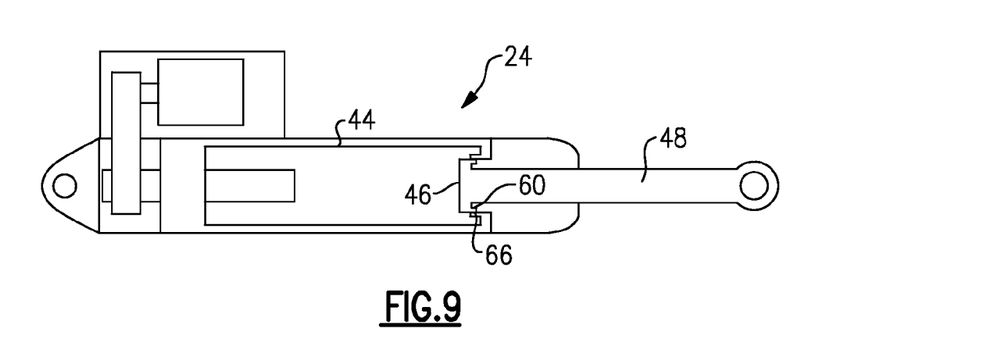

Referring to block 90 and FIG. 7, the extend/retract actuator 18 acts upon the landing gear 10 to rotate it to the stowed position. The rod 48 is moved axially inward and is permitted to free-drive relative to the finger tube 44 in response to movement by the extend/retract actuator 18. In doing so, the hooks and lip 66, 60 disengage from one another permitting the first set of fingers 62 to move radially outwardly relative to the guide 46. The landing gear 10 is fully stowed as indicated at block 92 and the guide 46 and rod 48 are positioned as indicated in FIG. 8.

Figure 10A:
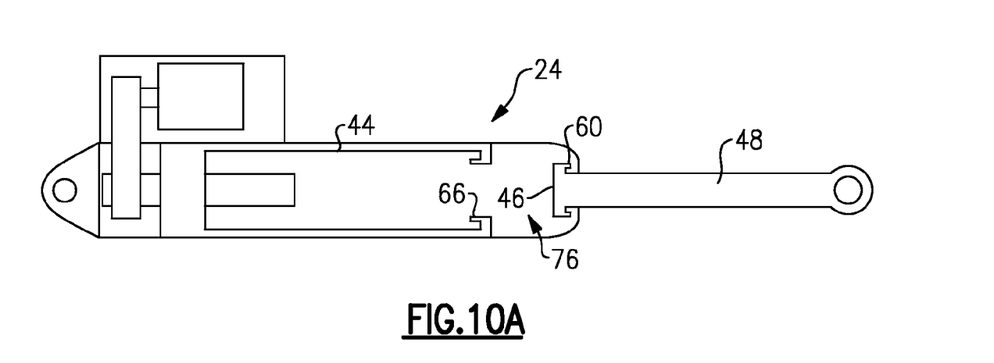

When the pilot initiates a command to deploy the landing gear 10, as indicated at block 94, the landing gear 10 will fully deploy despite the jammed unlock actuator. Referring to block 96 in FIG. 9, the extend/retract actuator 18 rotates the landing gear 10 to the deployed position. The rod 48 moves axially outwardly relative to the finger tube 44. Even with the finger tube 44 stuck in an undesired position, the rod 48 is permitted to free-ride and fully extend in response to movement of the extend/retract actuator 18 to permit the lock-stay 22 to lock. As shown in FIGS. 10A and 10B, the rod 48 decouples from the finger tube 44. In one example, the guide 46 is permitted to move past the hooks 66 into space 76 since the hooks 66 are arranged radially outward of the lip 60. The biasing member 26 biases the lock-stay 22 to the locked position as shown at block 98. If the pilot commands the landing gear to a stowed position, as indicated at block 100, the unlock actuator 24 will not permit retraction of the rod 48 and the landing gear 10 will remain locked in the fully deployed position, as indicated at block 102. Faces 77 of protrusions 68 will engage ends 75 of the second set of fingers 64 (FIG. 10B) thereby preventing the guide 46 from again entering the finger tube 44. A fault will again be sent, as indicated at block 104.

In this manner, the landing gear 10 is permitted to cycle from a fully deployed position to a stowed position with a jammed unlock actuator. The landing gear is also permitted to cycle from the stowed position to a fully deployed position once with a jammed unlock actuator 24, after which replacement of the unlock actuator is required. The landing gear 10 is not permitted to again cycle from the fully deployed position to a stowed position.

Although an example embodiment has been disclosed, a worker of ordinary skill in this art would recognize that certain modifications would come within the scope of the claims. For that reason, the following claims should be studied to determine their true scope and content.

What is claimed is:

1. A landing gear actuator comprising:
a motor;
a screw coupled to the motor;
a member having a nut that is coupled to the screw, the member movable between first and second positions that correspond to locked and unlocked conditions; and
a rod movable relative to the member during a jammed condition in which member is arranged in an undesired position between the first and second positions, the rod being permitted to free-drive relative to the member with the member in the undesired position.

2. The landing gear actuator according to claim 1, wherein the member includes fingers and the rod is connected to a guide, the finger and guide interlocking with one another under normal operating conditions, and the fingers and guide decoupling from one another during the jammed condition permitting the rod to free-drive relative to the member.

3. The landing gear actuator according to claim 2, wherein the jammed condition corresponds to the member in the undesired condition.

4. The landing gear actuator according to claim 2, comprising a collar deflecting the fingers radially to engage the guide with hooks provided by the fingers.

5. The landing gear actuator according to claim 2, wherein the member pulls the rod from the lock condition to the unlock condition with the fingers and guide interlocked.

6. The landing gear actuator according to claim 4, wherein the fingers include an undeflected position in the undesired position in which the member is spaced from the collar.

7. The landing gear actuator according to claim 6, wherein the guide is configured to slide past the hooks in the undesired position and free-drive relative to the member.

8. The landing gear actuator according to claim 6, wherein the member and rod are coaxial and are nested relative to one another during normal operating conditions, the guide being blocked from being received in the member when the guide is arranged in a space between the collar and the member.

9. The landing gear actuator according to claim 8, wherein the member occupies the space when in the second position during normal operation preventing the guide from moving axially past the fingers.

10. The landing gear actuator according to claim 1, comprising position sensors configured to detect a position of the member.

11. A method of actuating a landing gear comprising the steps of:
   commanding an unlock actuator to retract a lock-stay;
   jamming a portion of the unlock actuator in an undesired position;
   commanding another actuator to retract the landing gear;
   free-driving the unlock actuator in the undesired position with the other actuator; and
   deploying the landing gear from a stowed position to a deployed position with the actuator in the undesired position.

12. The method according to claim 11, comprising the step of blocking another portion of the unlock actuator and preventing restowing of the landing gear subsequent to the deploying step.

13. The method according to claim 12, comprising the free-driving step includes free-driving another portion of the unlock actuator relative to the portion when in the undesired position.

* * * * *